United States Patent [19]

Metzger

[11] 3,751,580

[45] Aug. 7, 1973

[54] COLOR TEMPERATURE CONTROL FOR TELEVISION APPARATUS

[75] Inventor: Lenard M. Metzger, Rochester, N.Y.

[73] Assignee: Eastman Kodak Company, Rochester, N.Y.

[22] Filed: Oct. 5, 1971

[21] Appl. No.: 186,746

[52] U.S. Cl. ...... 178/5.4 R, 178/5.2 D, 178/5.4 CD

[51] Int. Cl. ....... H04n 9/12

[58] Field of Search ....... 178/5.4, 5.2, 5.4 CD, 178/5.2 D, 5.4 BT

[56] References Cited

UNITED STATES PATENTS

| | | | |
|---|---|---|---|
| 3,457,362 | 7/1969 | Mackey et al. | 178/5.4 R |
| 3,542,944 | 11/1970 | Peffer et al. | 178/5.2 R |
| 3,324,236 | 6/1967 | Dietch et al. | 178/5.4 R |
| 3,562,410 | 2/1971 | Lovely | 178/5.4 R |

*Primary Examiner*—Richard Murray
*Attorney*—William H. J. Kline et al.

[57] ABSTRACT

Apparatus and method for compensating for color temperature variation in scene illuminants, image recordings, or image reproduction through optical-to-electrical and electrical-to-optical signal transducer apparatus. Color temperature control is effected through the inverse variation, with respect to each other, of at least two primary colors in a tri-color chromatic display.

2 Claims, 4 Drawing Figures

LENARD M. METZGER
INVENTOR.

BY Joseph F. Breimayer
W. H. J. Kline
ATTORNEYS

LENARD M. METZGER
INVENTOR.

BY Joseph F. Breimayer
W. H. J. Kline
ATTORNEYS

COLOR TEMPERATURE CONTROL FOR TELEVISION APPARATUS

CROSS REFERENCE TO RELATED APPLICATIONS

Reference is made to commonly assigned copending U.S. Pat. application Ser. No. 60,493, entitled FILM SCANNING FOR TELEVISION REPRODUCTION, filed Aug. 3, 1970 in the names of L. M. Metzger and D. L. Babcock.

BACKGROUND OF THE INVENTION

1. Field of the Invention

This invention relates to a method and apparatus for compensating for variations in color temperature of scene illuminants, image recordings, or image reproduction in optical-to-electrical and electrical-to-optical signal transducer apparatus.

2. Description of the Prior Art

The image display or image reproducer means of various electrical-to-optical signal transducer apparatus including, for example, the tri-color phosphorescent screens of color television receiver tubes may vary in accordance with manufacturer's specifications which designate various color temperature balances in the white region of color reproduction. This variation in color temperature balance constitutes one reason why the same program displayed on several color television receivers manufactured by different companies may differ in apparent color balance.

Other factors that contribute to an improper color balance in the image displayed by color television receivers include variations in the illumination of a scene recorded by a color television camera and transmitted to the television receiver. Further variations in color temperature balance may occur when the signal transmitted to the color television receiver is derived by optical-to-electrical signal transducer apparatus, such as film reproduction apparatus or television cameras, which are balanced at color temperatures that differ from the color temperature balance of the receiver. Furthermore, film reproduction apparatus is responsive to images on black and white or color, still or motion picture, film to develop electrical signals representative of the primary colors in a scene which may have been illuminated by light of a further color temperature differing from that at which the film reproduction apparatus and the receiver have been balanced. Because the television receiver image display tube is balanced at a color temperature which differs from the color temperature of the film, the electrical signals derived from the film and applied to the color television receiver (after video signal processing) may produce an image which is unacceptable in color balance.

Although color television receivers are normally supplied with color balance controls that may be adjusted by the consumer to effect a pleasing balance of the program material transmitted by commercial television stations, I have found that such color balance controls are insufficient to overcome the disparity and color balance caused by any combination of the aforementioned factors and occurring when film images are reproduced on a color television screen through the cooperation of the television receiver with a home film reproduction apparatus of the type disclosed in the aforementioned copending, commonly assigned, U.S. Pat. application Ser. No. 60,493. Furthermore, I have found that the disparity in color balance in such apparatus follows a predetermined pattern, and I propose a method and apparatus of compensating for such imbalances in color temperatures.

SUMMARY OF THE INVENTION

Accordingly, it is an object of the present invention to compensate for imbalances in color temperatures found in optical-to-electrical signal transducer apparatus and electrical-to-optical signal transducer apparatus.

Another object of the invention is to controllably vary the color balance of an electrical-to-optical signal transducer apparatus as a function of signals developed by an optical-to-electrical signal transducer apparatus.

It is also an object of the present invention to provide a method for compensating for imbalances in color temperature found in optical-to-electrical signal transducer apparatus and electrical-to-optical signal transducer apparatus.

I have found that the color temperature variation in optical-to-electrical signal transducer apparatus and in electrical-to-optical signal transducer apparatus resides along a color axis between first and second respective primary colors. The color temperature balance control method and apparatus of my invention contemplates varying the relative intensities of first and second electrical signals representative of the first and second respective primary colors in an inverse manner while maintaining a third electrical signal representative of a third primary color at a constant intensity, whereby the effective color balance of electrical-to-optical signal transducer apparatus may be varied to provide a pleasing color reproduction.

The invention, and its objects and advantages, will become more apparent in the detailed description of the preferred embodiment presented below.

DESCRIPTION OF THE PREFERRED EMBODIMENT

Figure 1:
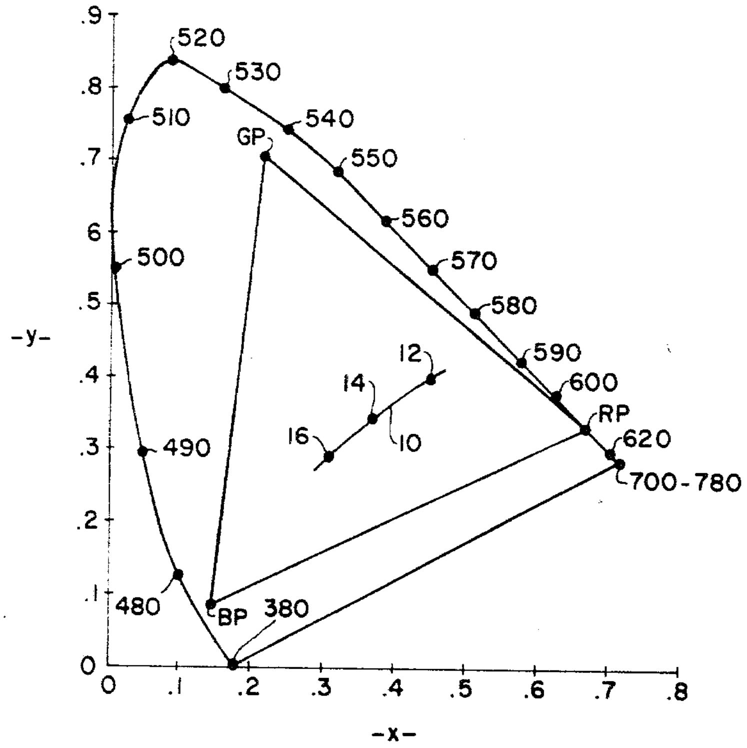
FIG. 1 is a conventional chromaticity diagram in X and Y coordinates plotted with color temperature illustrating the teaching of the present invention.

Referring now to the drawings and first to FIG. 1, by way of background, there is shown a standard CIE Chromaticity Diagram (specified by the International Color Commission or Commission Internationale de l'Éclairage (CIE) which met in 1931 in Cambridge, England) including a color temperature curve 10 along the white color axis of the chromaticity diagram. The positions of the various spectrum colors from violet at 400 mμ to green at 520 mμ and to red at 700 mμ are indicated around the curve. Any point not actually on the solid line curve but within the diagram represents not a pure spectrum color but some mixture of spectrum colors. Since white is such a mixture, it, too, lies within this diagram, specifically, along the points on curve 10. There is no specific white light, since sunlight, skylight, and daylight are all forms of white light, and yet the color components of each differ considerably. The color temperature of a conventional color television receiver tube is represented by some point in the central region of the diagram about the line 10.

The chromaticity chart lends itself readily to color mixing, bacause the straight line joining any two points on the curve will indicate all the different color variations that can be obtained by combining these two colors additively. Thus, consider the line drawn connecting points RP and GP representing certain shades of red and green respectively. If there is more red light than green light the exact point representing the new color will lie on the line but be closer to RP than GP. If, it is desired to determine what range, or gamut, of colors can be obtained from any three given colors we would draw connecting lines to each of the colors. The result is the triangle depicted in FIG. 1 created by connecting points GP, RP and BP. The points GP, RP and BP constitute the NTSC primary colors, and the colors shown within the triangle are reproducable on a color television receiver screen. A more complete discussion of the CIE chromaticity diagram of FIG. 1 may be found in the textbook entitled COLOR TELEVISION FUNDAMENTALS, Second edition, by Milton S. Kiver, McGraw-Hill Book Company, 1964, pages 1–40 and with respect to color temperature, in COLOR IN BUSINESS, SCIENCE AND INDUSTRY by Deane B. Judd, John Wiley and Sons, Inc., 1952, pages 203–209.

The curve 10 depicted within the NTSC triangle of FIG. 1 connects the points 12, 14 and 16 which specify the location of various color temperature illuminants as shown in the aforementioned Judd treatise. For example, a tungsten light source at a color temperature of 2,850° K., is shown as point 12, sunlight at a color temperature of 4,800° K. is shown at point 14 and a daylight flourescent light source at a color temperature of 6,500° K. is shown as point 16. Normally, the color image reproduction of the color television receiver is balanced for 6,500° K. or point 16. However, for various reasons, color television receivers are balanced at color temperatures other than 6,500° K. up to 12,000° K. by many television manufacturers. For example, one manufacturer may specify a color temperature balance at point 14. When the same program material is displayed by two television receivers balanced at the standard color temperature indicated by point 16 or at a lower color temperature such as point 14, the color image reproduced by the color television receiver balanced at point 14 will appear to be warmer in tone than the color image reproduced by the receiver balanced at point 16.

When viewed separately, both television receivers may produce a color image of a commercially transmitted program which is acceptable to the consumer. However, when a television receiver is connected with a home film reproduction or "telecine" apparatus which is balanced for 6,500° K. (point 16 in FIG. 1), the color temperature difference between the television receiver and the telecine apparatus becomes of importance to the proper reproduction of the motion picture film displayed on the color television receiver. Therefore, I have found it desirable to provide apparatus for compensating for the color temperature variations in color television receivers coupled to such telecine apparatus.

A further color temperature balance problem occurs in reproduction of motion picture or still film which is erroneously exposed to improper illumination in such telecine apparatus since the color temperature of the illumination of the scene captured by the motion picture film may differ greatly from the color temperature balance intended by the film manufacturer and from the color temperature balance of the telecine apparatus and/or the color television receiver. For example, if motion picture film balanced for tungsten illumination is exposed to a scene illuminated by daylight at a color temperature of 6,500° K., the electrical signals produced by the optical-to-electrical signal transducer apparatus of the telecine apparatus in response to the red, blue and green color components of the image carried by the motion picture film will be imbalanced, and the resulting image display on the color television receiver will appear to be cold (i.e., too much blue, insufficient red). To compensate for this, the telecine color temperature balance should be shifted from point 16 to point 12.

It can be seen from FIG. 1 that the locus of the various color temperature illuminants falls on the curved line 10 that remains at approximately a constant distance from the green primary color GP. Also, the relative distances from the red and blue primary colors, RP and BP respectively, vary inversely with each other in traveling from point 16 to point 12. Therefore, a control that varies the gains of the red and blue video color channels in an inverse manner will shift the color temperature of the television display along the locus of line 10 and maintain a neutral color temperature display. I have found that this can be accomplished through the use of an electronic circuit shown in more detail in FIGS. 2–4.

Figures 2, 3:
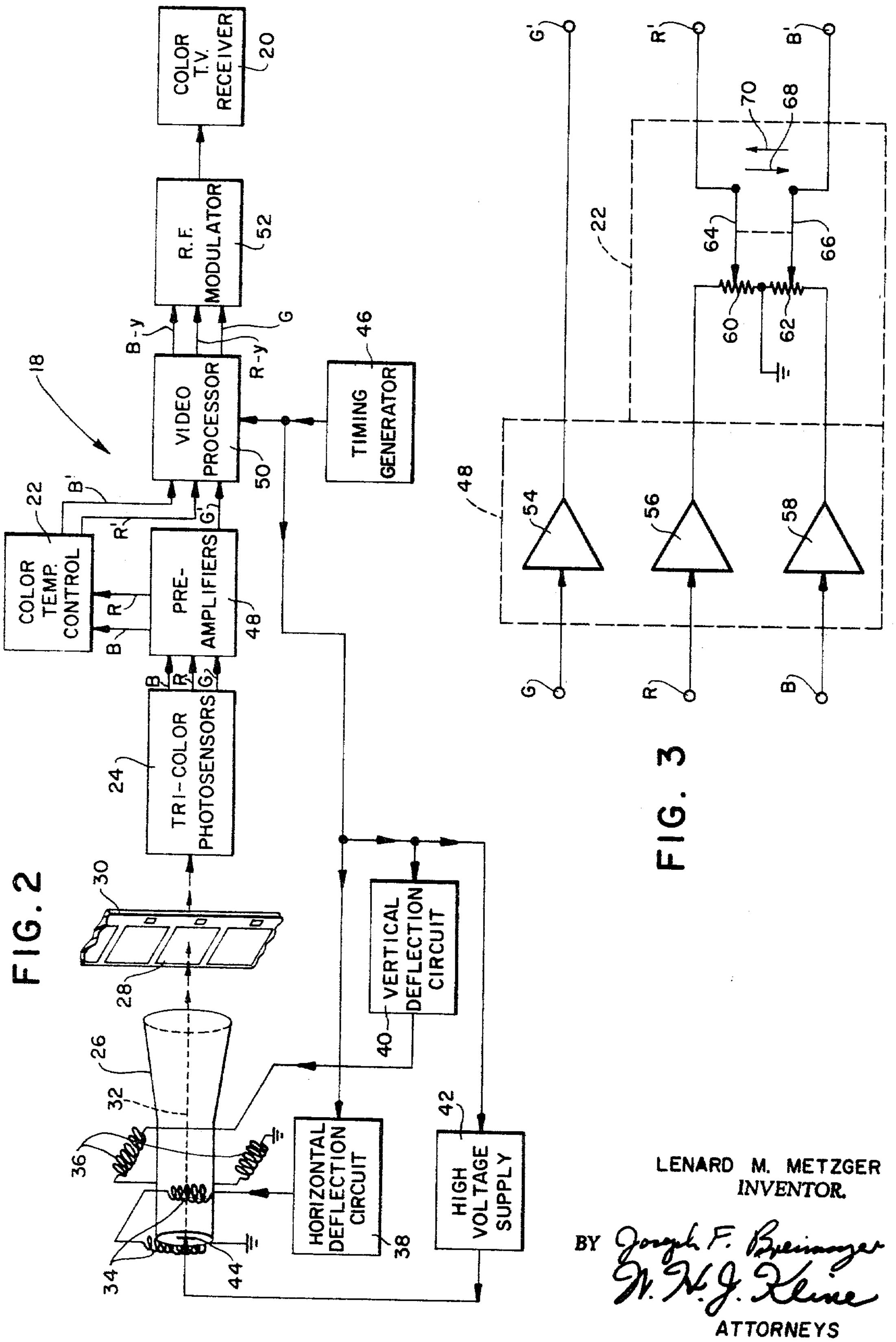
FIG. 2 is a schematic representation in block diagram of optical-to-electrical signal transducer apparatus, electrical-to-optical signal transducer apparatus and color temperature control apparatus.
FIG. 3 is a schematic illustration in further detail of the color temperature control apparatus of FIG. 2.

Referring now to FIG. 2, there is shown in block diagram from a simplified telecine apparatus generally denoted as 18 coupled to a color television receiver 20 referred to more generally as electrical-to-optical signal transducer apparatus. The telecine apparatus 18 includes a color temperature control 22 which has been provided in accordance with the teachings of my invention to vary in an inverse manner the intensity of first and second electrical signals representative of the red and blue colors of the scene to be reproduced by the color television receiver 20.

In FIG. 2, the color telecine apparatus 18 further comprises optical-to-electrical signal transducer apparatus including the tri-color photosensors 24 which respond to the flying spot scanner tube 26 which scans each frame 28 of motion picture film 30 in raster pattern of sequential horizontal line deflections of the electron beam 32 controlled by the horizontal and vertical deflection coils 34 and 36, respectively. The horizontal deflection coil 34 is controlled by the horizontal deflection circuit 38, whereas the vertical deflection coil 36 is controlled by the vertical deflection circuit 40. A high voltage supply 42 is connected to the electron emitting cathode 44 of the flying spot scanner tube 26. The horizontal deflection circuit 38, the vertical deflection circuit 40 and the high voltage supply 42 are all controlled by timing generator 46. The telecine apparatus 18 operates in a manner well known in the prior art and shown in greater detail in the aforementioned commonly assigned copending U.S. Pat. application Ser. No. 60,493.

The scanned frame 28 of the motion picture film 30 is directed upon the tri-color photosensors 24 which individually respond to the three primary colors red, green and blue to produce first, second and third electrical signals designated R, G and B that are amplified in pre-amplifiers 48 under the control of the color temperature control 22 which modifies the signals R, G and B to produce the signals R', G' and B'. The signals R', G' and B' are applied to the video processor 50 of the telecine apparatus which combines the signals R', G' and B' to produce the conventional color television signal R–Y, B–Y and Y. The color television signals R–Y, B–Y and Y are applied to the RF modulator 52 which encodes the signals R–Y, B–Y and Y with a high frequency carrier signal corresponding in frequency to an unusued local television transmitting channel. The output signal of the RF modulator 52 is applied to the antenna terminals of the color television channel to receive the television signal produced by the telecine apparatus.

The timing generator 46 is also applied to the video processor 50 to encode the television signal developed by the RF modulator 52 with suitable synchronizing signals.

Referring now to FIG. 3 there is shown in greater detail the pre-amplifiers 48 and color temperature control 22 of the present invention. The pre-amplifiers 48 comprise amplifier stages 54, 56 and 58 adapted to amplify the signals G, R and B respectively. Coupled to the output terminals of the amplifier stages 56 and 58 are ganged potentiometers 60 and 62 respectively that are commonly connected at one terminal to ground potential. The movable, ganged, wiper arms 64 and 66 of the potentiometers 60 and 62, respectively, are connected to the output terminals indicated by R' and B' respectively. The ganged wiper arms 64 and 66 operate, when moved in the direction of the arrow 68, to decrease the signal level of the amplified signal R and increase the signal level of the amplified signal B, whereby the balance of the output signals R' and B' are shifted along the line 11 of FIG. 1 from the point 12 to the point 16. Conversely, when the wiper arms 64 and 66 are moved in the direction of the arrow 70, the signal level of the amplified signal B is decreased whereas the signal level of the amplified signal R is increased, whereby the color balance of the resulting output signals R' and B' is shifted along the line 10 of FIG. 1 from point 16 to point 12. It will be noted that in neither instance is the relative intensity of the amplified signal G changed. Therefore, as shown in FIG. 3, a simple control has been effected for shifting the color balance of the color telecine apparatus to compensate for color temperature variations between the color temperature of the image captured by the motion picture film 28, the color temperature of the telecine apparatus, and the color temperature of the color television receiver 20.

Figure 4:
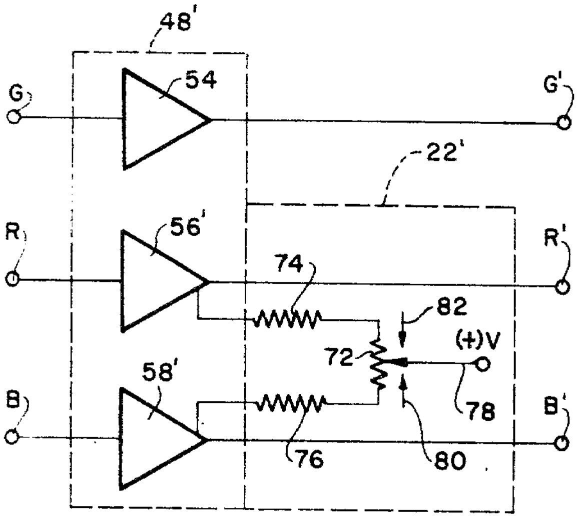
FIG. 4 is an alternative schematic illustration in further detail of the color temperature control apparatus of FIG. 2.

Referring now to FIG. 4, there is shown a schematic illustration of a further embodiment of the present invention. In FIG. 4, the color temperature control 22' operates to vary inversely the relative gains of the amplifier stages 56' and 58' through a variable resistor 72 connected by means of resistors 74 and 76 to the gain controls of amplifier stages 56' and 58' respectively, and by movable wiper arm 78 to a positive voltage source + B. When movable wiper arm 78 is moved in the direction of the arrow 80, the gain of the red signal amplifier stage 56' is increased whereas the gain of the blue signal amplifier stage 58' is decreased, whereby the signal level of the output signal R' is increased and the signal level of the output signal B' is decreased. In the same manner as described with respect to FIG. 3, the movement of the movable wiper arm 78 in the direction of the arrow 80 shifts the color balance of the telecine apparatus from point 16 to point 12 on the line 10 in FIG. 1, and the movement of the movable wiper arm 78 in the direction of the arrow 82 tends to shift the color balance of the telecine apparatus from point 12 to point 16 along the line 10 of FIG. 1. Therefore, the color temperature control 22' of FIG. 4 tends to compensate for variations in the color temperature balance of the motion picture film 28, the telecine apparatus, and the color television receiver 20.

Although telecine apparatus 18 has been disclosed in FIG. 2 in association with color temperature balance control apparatus of FIGS. 3 and 4, it is apparent that other optical-to-electrical signal transducer apparatus such as television cameras may be associated with a television receiver 20 and provided with such color temperature balance control apparatus.

In summary, it will be readily apparent that by virtue of the novel color temperature balance control disclosed as method and apparatus for compensating for color temperature variations in scene illuminants, image recordings or image reproduction through optical-to-electrical and electrical-to-optical signal transducer apparatus has been disclosed.

The invention has been described in detail with particular reference to preferred embodiments thereof, but it will be understood that variations and modifications can be effected within the spirit and scope of the invention.

I claim:

1. Telecine apparatus for converting color pictorial information in image frames on color motion picture film into video signals for reproduction of the pictorial information as a display on color video display apparatus comprising:

gate means for defining a scanning gate;

means for moving the motion picture film past said scanning gate;

scanning means for producing a moving spot of white light in a raster pattern of sequential horizontal scans and for scanning the image frames of the film moving past said scanning gate with said moving spot light;

optical to electrical signal transducer means responsive to the moving spot of light modulated by the color pictorial information of the scanned image frames for producing first, second and third electrical signals each representative of the first, second and third respective primary colors of light;

color temperature balance control means responsive to the first and second signals for varying the relative intensities for such signals with respect to each other;

video signal means for producing a composite video electrical signal;

means for applying the intensity varied first and second electrical signals, and the third electrical signal to the video signal means, such that said video signal means produces a color temperature balanced composite video electrical signal having components which are a function of said intensity varied first and second signals and said third signal; and output means connected to said video signal means and connectible to a color video display apparatus for applying the color temperature balanced composite video signal to the color video display apparatus so that color image reproductions of image frames of said film are displayed thereby having a color temperature which is varied in accordance with the variation in intensity of the first and second signals.

2. The apparatus of claim 1 wherein the first, second and third electrical signals are representative of the red, blue and green colors in the color pictorial information in said image frames, and the color temperature balance control means is operable to adjust the intensities of the first and second signals in an inverse manner with respect to each other to shift the color temperature of the optical image reproduction along the red and blue primary color axis while the balance of the green primary color remains constant.

* * * * *